United States Patent [19]

Lewis

[11] Patent Number: 5,510,939
[45] Date of Patent: Apr. 23, 1996

[54] DISK DRIVE WITH ADAPTIVE POSITIONING

[75] Inventor: Martyn A. Lewis, Pacific Palisades, Calif.

[73] Assignee: Micropolis Corporation, Chatsworth, Calif.

[21] Appl. No.: 915,104

[22] Filed: Jul. 16, 1992

[51] Int. Cl.$^6$ .................................................. G11B 5/596
[52] U.S. Cl. ...................................... 360/78.09; 360/77.07
[58] Field of Search ........................... 360/78.09, 78.12, 360/78.04, 77.04, 77.07–77.11, 77.05; 318/560; 364/149–151, 164, 165, 77.01, 77.02

[56] References Cited

U.S. PATENT DOCUMENTS

| | | | |
|---|---|---|---|
| 4,072,990 | 2/1978 | Case et al. | 360/77 |
| 4,424,543 | 1/1984 | Lewis et al. | 360/135 |
| 4,477,755 | 10/1984 | Rickert | 360/78.09 |
| 4,679,103 | 7/1987 | Workman | 360/78.09 |
| 4,775,903 | 10/1988 | Knowles | 360/78 |
| 4,835,633 | 5/1989 | Edel et al. | 360/78.12 |
| 4,947,093 | 8/1990 | Dunstan et al. | 310/560 |
| 4,954,907 | 9/1990 | Takita | 360/78.07 |
| 5,010,535 | 4/1991 | Davis | 360/78.09 |
| 5,062,012 | 10/1991 | Maeda et al. | 360/75 |

OTHER PUBLICATIONS

Otteson, "Digital Servo Control For High Performance VCM in DASD," pp. 23–28 Proceedings of Eighteenth Annual Symposium, Incremental Motion Control Systems Society, 1989.
Franklin, Powell And Workman, "Digital Control of Dynamic Systems," 2nd Edition, pp. 46–53, 56–61, 250–260, 584–588, 741–742, Addison–Wesley Publishing Co., 1989.
Lewis, "Design Strategies For High Performance Incremental Servos," pp. 143–144, Proceeings of Sixth Annual Symposium, Incremental Motion Control Systems Society, 1977.
Workman, "Adaptive Proximate Time–Optional Servomechanism," Stanford University Ph.D. Thesis, 1987, pp. 40–45.
Press, et al., "Numerical Recipes," pp. 289–292, Cambridge University Press, 1986.
Franklin, Powell and Emami–Naeini, "Feedback Control of Dynamic Systems," pp.312–314, Addison–Wesley Publishing Co., 1989.
van der Kruk and Scannell, "Motion Controller Employs DSP Technology, " pp. 94–101, Power Conversion and Intelligent Motion, Sep. 1988.
Dennis and Woods, "New Computing Environments" Microcomputers In Large Scale Computing, pp. 116–122, Society of Industrial Applied Mathematics Journal, 1987.
Mueller et al., "IBM Technical Disclosure Bulletin," vol. 21, No. 2, pp. 804–805, Feb. 1978.
Head positioning servo systems and High track density by R. K. Oswald Mar., 1988.

*Primary Examiner*—Andrew L. Sniezek
*Attorney, Agent, or Firm*—Poms, Smith, Lande & Rose

[57] ABSTRACT

A disk drive system with adaptive positioning employs one or more storage disks for recording data, one or more read and write heads for performing input/output operation on the disks, with at least one of the heads being used as a servo head, a head-positioning mechanism for controlling the movement of the heads, and a digital compensator for predicting the post-seek displacement of the heads due to internal accelerations and to provide a compensating control signal to the head-positioning mechanism. The compensator includes means for approximating an nth order transfer function and learning algorithms for adapting to the dynamic response characteristics of an individual disk drive unit. The positioning of the heads is adapted to minimize post-seek displacements through trial seeks executed at disk startup and continually through background processes performed during normal input/output operations.

5 Claims, 8 Drawing Sheets

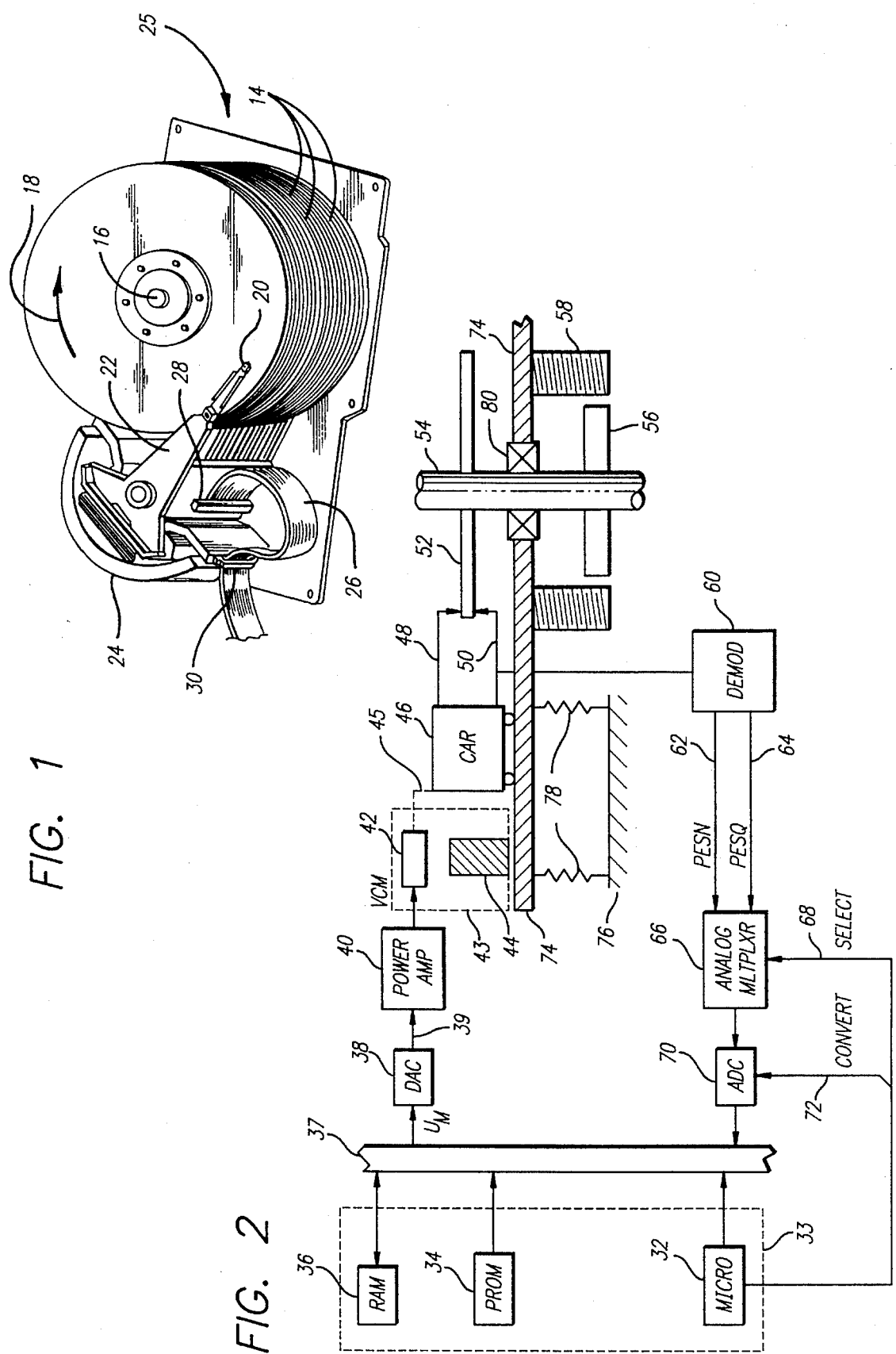

STATE ESTIMATOR

ADAPTIVE POSITIONING
CONTROL SEQUENCE

100 TO 1000 TRACK SEEKS, NO FEED FORWARD

100 TO 1000 TRACK SEEKS, WITH FEED FORWARD ection of the dedicated servo concept may be found in MUELLER, ET. AL., IBM TECHNICAL DISCLOSURE BULLETIN, Vol 21, No. 2, 804, 805 (February 1978)

DISK DRIVE WITH ADAPTIVE POSITIONING

FIELD OF THE INVENTION

This invention relates to disk drive digital storage devices and, more particularly, to control circuitry for minimizing the post-seek tracking errors experienced by the positioning of a data transfer head.

BACKGROUND OF THE INVENTION

Digital disk drives are widely used in computer systems to permit rapid storage and retrieval of information. Such devices are typically comprised of one or more co-rotatable disks, one or more movable write/read heads and an electronics assembly. The rotatable disks have invisible concentric tracks, to or from which information is written and read using the movable magnetic write/read heads. The write/read heads are commonly mounted on an arm wherein a motor moves the arm either linearly or arcuately. Often such a motor is a voice coil motor (a "VCM") or a moving magnet motor (a "MMM"). The stator of the VCM is mounted to a base plate or casting on which is mounted a spindle supporting the disks. The base casting is in turn mounted to a frame via a compliant suspension. When current is fed to the motor, the VCM develops force or torque which is substantially proportional to the current, wherein the constant of proportionality is known as the actuator force or torque constant. The arm acceleration is therefore substantially proportional to the magnitude of the current. The constant of proportionality is known as the actuator acceleration factor (the "aaf"), and is equal to the actuator force or torque constant divided by the moving mass or inertia respectively. The force or torque developed by the motor is also experienced in an equal and opposite sense by the VCM stator and the base casting.

The two primary objects of a head positioning system are (1) to maintain the head at or very near the track centerline while writing or reading and (2) to move the head rapidly from one track to another so as to minimize the time taken to locate the head at or near the centerline of a target track. The latter function is known as "seeking". Typically, a head must be located with an accuracy of the order of ±10% of the distance between the centerlines of adjacent tracks (the "track pitch"). In the current art, the track pitch may be of the order of 500 microinches, which means the head must be located within approximately ±50 microinches of the track centerline for successful read or write operations to take place. Therefore, at the end of a seek, the head must "settle" to within ±50 microinches of the target track centerline before write or read operations are permitted. As track densities become higher, the settling requirement becomes increasingly onerous.

All disk drives today have a relatively high density of concentric information tracks (almost invariably greater than 1000 tracks per inch). Accordingly, an accurate servo control system is required to position the head on the track centerline and to move the head from one track to another. Such a control system typically depends on position information recorded on one or more of the disk surfaces. There are many types of position information systems used but three basic categories exist; (1) the dedicated servo surface, (2) servo sectors, and (3) a combination of (1) and (2). A description of the dedicated servo concept may be found in MUELLER, ET. AL., IBM TECHNICAL DISCLOSURE BULLETIN, Vol 21, No. 2, 804, 805 (February 1978) [hereinafter "MUELLER"]. A description of sector servos may be found in Lewis, et. al., U.S. Pat. No. 4,424,543, issued Jan. 3, 1984. A description of a system employing a combination of dedicated and sector servos may be found in Case, et. al., U.S. Pat. No. 4,072,990, issued Feb. 7, 1978. It is to be noted that the present invention applies equally to disk drives utilizing dedicated servo, sector servo and combinations of the two.

The highest performance positioning systems today utilize digital control systems. The general theory of such systems is described in G. FRANKLIN, J. POWELL, & M. WORKMAN, DIGITAL CONTROL OF DYNAMIC SYSTEMS, (2d ed. 1990) [hereinafter FRANKLIN]. Several patents disclose digital control systems with particular application to disk drive head positioners. See, e.g., Workman U.S. Pat. No. 4,679,103, issued Jul. 7, 1987, Edel, et. al. U.S. Pat. No. 4,835,633, issued May 30, 1989, and Takita U.S. Pat. No. 4,954,907, issued Sep. 4, 1990. Each of these systems employs a state estimator as described generally in Chapter 6 of FRANKLIN, supra, at 250.

One problem with current head positioning systems is the impairment of settling time due to the reaction force or torque experienced by the VCM stator and the base casting. This force or torque causes the casting, and therefore the target track on the disk, to move with respect to the arm supporting the head. This motion has dynamics related to the characteristics of the suspension between frame and casting. These motions are sometimes referred to as internally induced motions or self-excited motions to distinguish them from motions caused by external shock or vibration. The suspension typically behaves as a lightly damped second order resonance. Consequently, seek lengths of particular time durations will, even after the VCM force or torque has subsided, elicit sympathetic post-seek oscillatory motions between head and track. Very often, the servo loop bandwidth is insufficient to track these motions, resulting in an extended seek time.

The phenomenon of such post-seek motions is discussed in FRANKLIN, supra, at 741, 742. The discussion proposes the implementation in the state estimator of a model of the structural resonance of the disk drive which model, at disk start-up, is adapted to track the actual resonance of the drive. Previous proposals directed to this approach have utilized accelerometers and include Knowles U.S. Pat. No. 4,775,903, issued Oct. 4, 1988, and an article entitled "Design Strategies for High-Performance Incremental Servos" by Martyn A. Lewis, Proceedings of the Sixth Annual Symposium on Incremental Motion Control Systems Society, at 143, 144, May 1977, Department of Electrical Engineering, U. of Ill., Urbana Champagne, Ill. However, these methods require costly accelerometers to measure the post-seek displacement of the head. Furthermore, in the method disclosed by Knowles, the acceleration profile and track position trajectory signals were sampled for each duration of seek length. Each of these sampled values had to be stored in memory and accessed through a "look-up" procedure at the beginning of each new seek operation.

The use of a mathematical model of the physical plant to predict the post seek displacements has inherent limitations in practice. First, accurate models involve intensive computations which are inappropriate for the low-cost microcontroller ordinarily found in disk drives. Secondly, such a model is necessarily limited to the particular plant structure for which it is developed and must be modified to account for changes in the physical construction of the disk drive. Finally, a model is at best an abstraction from reality, and the effectiveness of even a perfect model of the physical plant will be undermined by variations in the characteristics of the other components of an actual disk drive.

The traditional approach to modelling the reaction of a physical system such as a disk suspension has been to accumulate through sampling, a time series of control inputs and the corresponding outputs or dynamic response, and from this data attempt to construct or derive a transfer function which accurately describes the relationship between the input and the output states of the system. In the case of a disk drive, such an approach would entail collecting the position signals generated by the control circuitry, and matching those to the observed resonance of the suspension system, as measured by sampling the position error signals. However, during a seek operation, the acceleration of the head relative to the track position is dominated by the dynamic response characteristics of the positioning motor coil. The relationship between the control input and the response of the suspension can only be observed after the control input has subsided below a certain threshold. Furthermore, a mathematical model which accurately describes the observed relationship involves transcendental elements and is computationally intensive. Thus, it is desirable to employ a method which requires only that the position error samples be collected and analyzed, and which minimizes the required computations.

An entirely different technique is described in Dunstan, et. al. U.S. Pat. No. 4,947,093, issued Aug. 7, 1990. This patent disclosed a method which uses the frequency modulation of the clocking information on a dedicated servo surface as an indication of the vibrations due to internal and external sources. After signal processing, the frequency modulation is fed forward to the VCM to compensate for the resulting track displacements. This method results in a signal to noise ratio which is less than may be desired. Furthermore, the Dunstan approach requires a clock of relatively high frequency which may not be available in a disk drive utilizing a pure sector servo method of positioning the head rather than a dedicated servo surface. In contrast, the present invention is applicable to both dedicated servo and sector servo systems.

Accordingly, the primary object of the present invention is to provide an effective, inexpensive means of adapting the positioning mechanism of an individual disk drive to minimize the displacement of the head due to internal accelerations. A further object is to provide a general method of compensating for post seek displacements which is independent of the physical structure of the disk drive and which minimizes the computational requirements placed on the control system. This approach will allow the design of the suspension to be optimized with respect to externally induced vibrations rather than being compromised to respond to both internally and externally induced vibrations.

SUMMARY OF THE INVENTION

In a disk drive storage system utilizing adaptive head positioning, a supplementary parallel forward loop compensator signal to anticipate and cancel the head displacement induced by the response of a suspension system to accelerations of the head across the rotating disks, is generated by adapting the free parameters of a digital compensator to minimize post seek displacements, and is added to the position control signal during and after seek operations.

In accordance with one exemplary embodiment of the present invention, a disk drive utilizing adaptive positioning includes, among other elements, a plurality of storage disks for recording data, a plurality of heads for performing input/output operation on the disks, with at least one of the heads being used as a servo head, a head-positioning mechanism for controlling the movement of the magnetic heads, and a digital compensator which predicts the post-seek displacement of the heads due to internal accelerations and which provides a compensating control signal to the head-positioning mechanism to keep the heads "on-track".

An estimator based digital control system typically contains a digital to analog convertor (DAC), a power amplifier, an actuator, and a position transducing system including a demodulator producing a position error signal (PES) and an analog to digital convertor (ADC). These components may collectively be referred to as "the plant". In addition, the control system includes a microcontroller which contains a digital representation, or model, of the plant. It is desirable for the model to be as accurate a representation of the plant as possible. The microcontroller, using the position control signal (numerically written to the DAC) to the plant together with digitized samples of PES can estimate the head position and velocity. The estimator error may be defined as the difference between the actual digitized PES and the position estimated using the model. With a perfectly matched plant and model, and with no external disturbances such as cable bias, friction, vibration, defects in PES, etc., the estimator error will be zero. However, the reaction force or torque of the head-positioning mechanism acting on the base casting and suspension during and after a seek operation results in a non-zero estimator error.

To overcome the effects of the reaction force or torque, the present invention employs a digital compensator to move the head so as to oppose the track displacements resulting from the suspension structure. The compensator includes a set of difference equations coded in the microcontroller. To compensate for the post-seek tracking errors induced by the suspension resonance, the sequence of compensator output values, suitably scaled, is algebraically added to the control signal sequence. The result is written to the DAC in place of the control signal, accomplishing the delivery of a "supplementary parallel forward loop compensator" signal to the head-positioning mechanism. If the compensator output is accurate, this anticipation of the expected track acceleration will compensate for the post-seek tracking errors.

In a practicable system, the characteristics of the suspension can vary considerably due to sample variations, temperature changes or aging. Therefore, it is necessary to adapt the compensator parameters to the actual suspension characteristics. In the present invention, this is accomplished by initializing the compensator with parameters set at nominal values corresponding to the middle of the expected range of variation of the actual suspension characteristics. When the disks first reach the proper speed and prior to commencing normal transactions with the host computer, a series of trial seeks is executed. The trial seeks should have a duration which elicits the maximum post-seek tracking error. During and after each trial seek, the supplementary parallel forward loop compensator signal is enabled. A short time after the control signal has subsided below a predetermined threshold, the system is considered to be in a track following mode.

Upon entering the track following mode, a predetermined number of PES samples are filtered and examined to discover the maximum tracking error. For seek lengths which are either relatively short or relatively long, the elicited post seek tracking errors are not substantial and may be ignored. Seek lengths within a predetermined range for which the post seek tracking errors are known to be significant are known as "provocative" seek lengths. For these seeks, a "cost value", which is a nonlinear function of the maximum tracking error, is computed. Preferably, the cost value is zero or small for peak errors less than about 5% of the distance between track centerlines and rapidly increases for peak errors greater than about 5% of this distance. If the cost value indicates an acceptable error, then the nominal parameters of the feed forward compensator are deemed adequate and no action is taken to improve them. However, if the cost value indicates an unacceptable error, further trial seeks are executed using a different set of compensator parameter values. The successive sets of compensator parameters values are chosen by a minimization algorithm, such as the Nelder-Meade simplex identified below in the description of the preferred embodiment.

When the cost value has been reduced below a predetermined threshold, no more trial seeks are executed and the disk drive is ready for normal activities. All future seeks are made with the compensator output signal enabled so that it is "fed forward" as a canceling signal. The result is that the track displacement is matched by an equivalent head arm displacement so that post-seek tracking errors are reduced.

Suspension characteristics may change, albeit slowly, after the initial adaptation procedure has been completed. These changes are typically due to temperature variations (internally or externally induced) or aging. To track these slight changes, the PES of all future seeks with a duration expected to cause significant post-seek displacements are filtered and examined for a predetermined number of post-seek PES samples. If the cost value of the post-seek sample set exceeds a predetermined threshold, the Nelder-Meade simplex is once again invoked, as a background task, to discover the new set of compensator parameter values which minimizes tracking error. Because this involves examination of actual seeks, there is no disruption of normal data transactions between the host computer and disk drive. The background task can utilize as little as 10% of each servo sample interval and still be fast enough to track the slow changes in suspension characteristics.

Accordingly, as described above, the invention has achieved our goals of (1) providing a compensator which has an output representative of the head acceleration required to reduce tracking errors, (2) adapting the compensator to the changing characteristics of the actual suspension by minimizing the PES signal during post seek periods, (3) continuing to adapt the compensator to changing suspension characteristics during normal disk drive activity without further trial seeks or disruption of normal disk drive activity, (4) allowing the design of the suspension to be optimized to respond to externally induced vibrations rather than being compromised to contend with both internally and externally induced vibrations, (5) compensating for suspension induced motion using the same compensator transfer function for all seek lengths, and (6) minimizing the computational burden involved in achieving all of the above results.

In accordance with the specific implementation of the invention, as described above, the invention has the advantage of employing existing circuitry for generating the signals necessary to compensate for the displacements caused by the internal accelerations. This implementation therefore avoids the necessity of additional arrangements for measuring the suspension characteristics and adapting the head-positioning mechanism accordingly.

It is to be understood that the above describes only one embodiment of the present invention. The principles of the invention may be implemented using any means which adapts to the dynamic response of a suspension system to internally generated accelerations, by adjusting the parameters of a compensator to minimize post-seek errors, and provides a signal to the head-positioning mechanism to compensate for the resulting track displacements.

It is also noted that the present invention is applicable to floppy disk and to optical disk storage systems, as well as to magnetic hard disk drives.

Other objects, features, and advantages of the invention will become apparent from a consideration of the following detailed description and from the accompanying drawings.

BRIEF DESCRIPTION OF THE DRAWINGS

FIG. 1 is a perspective view of particular components of an exemplary disk drive digital storage system.

FIG. 2 is a functional schematic diagram illustrating the elements of one embodiment of a disk drive system utilizing adaptive positioning.

DETAILED DESCRIPTION OF PREFERRED EMBODIMENT

Figure 3:
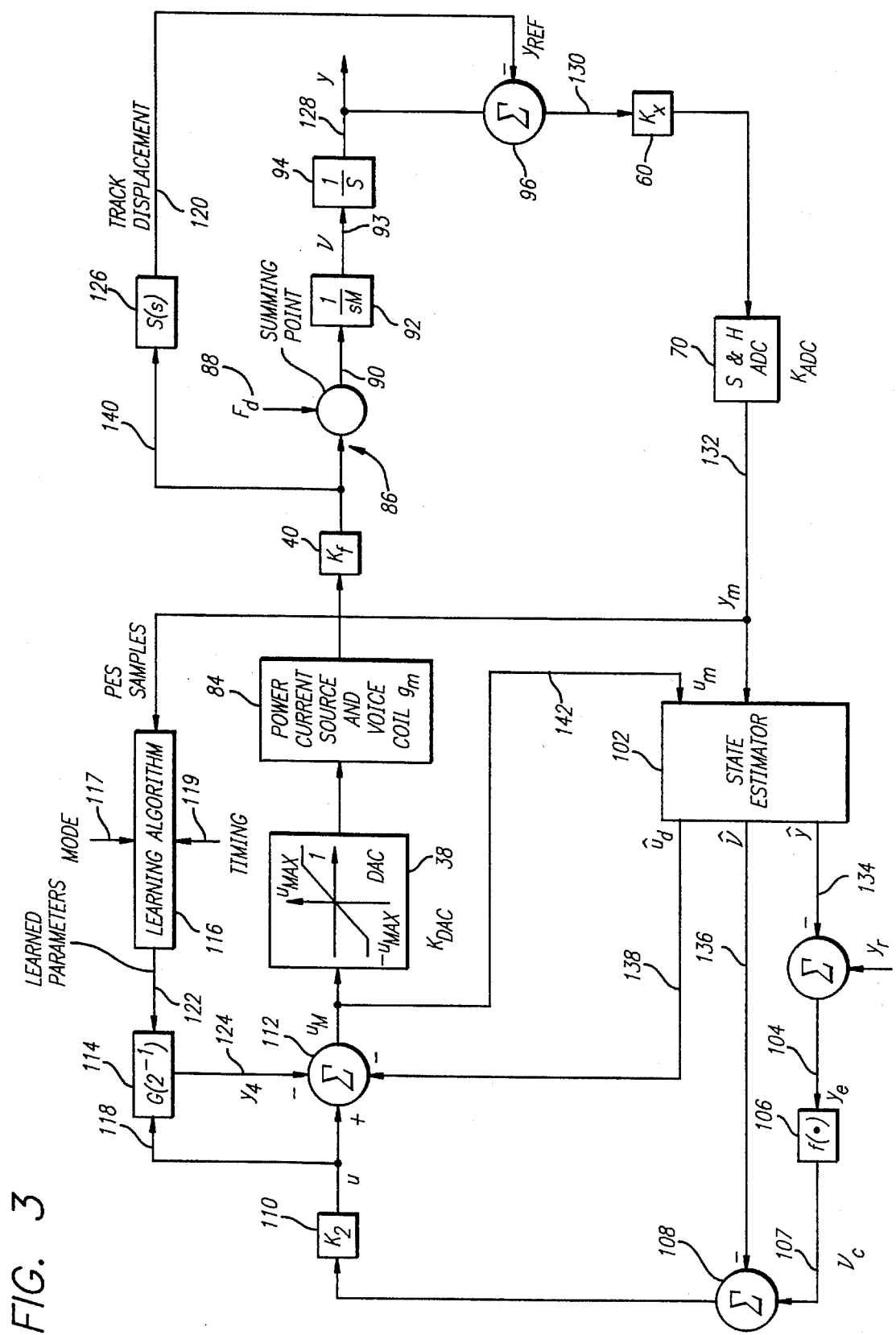
FIG. 3 is a block diagram of the control circuit useful for understanding the principles of the adaptive positioning system.

FIG. 1 is a perspective view of certain basic components in a typical hard disk drive. Included are a plurality of disks 14 stacked and mounted on a spindle 16 which is rotating as shown by an arrow 18. A plurality of write/read heads 20 (only one is visible in FIG. 1) are held in position over a desired track on the rotating disks 14 by a plurality of arms 22 which, in turn, are pivotally connected to a head positioning motor 24, which motor 24 moves the heads 20 arcuately across the rotating disks 14. Data is transferred to or from the heads 20 by electronic signals which travel through a ribbon cable 26 which is connected at a movable end 28 to the arms 22 and at a stationary end 30 to a portion of the frame of the head positioning motor 24. The spindle 16 and the motor 24 are mounted on a base casting or mounting plate 25, which plate 25 is commonly attached by means of a compliant suspension to an external frame which is not shown in FIG. 1. What has been described thus far is well known in the art as a Winchester disk drive. It is understood, however, that the present invention is applicable to all types of disk drives.

FIG. 2 is a simplified functional block diagram showing in more detail the relationships between the elements in a representative disk drive system employing a linear actuator to move the heads. A spindle 54 carries a single disk 52. The spindle and disk are rotated by spindle motor 56 which includes a stator 58. The upper surface of disk 52 is used for storage and retrieval of user information. Data head 48, adjacent to the upper surface of the disk 52 is used for both storage and retrieval of user data. The lower surface of the disk 52 is used exclusively for servo information. Servo head 50 reads the servo information. Both user information and servo information are arranged in concentric tracks on disk 52. The data head 48 and the servo head 50 are rigidly connected to a carriage arm 46, which is itself rigidly attached to the moving element (the coil) 42 of the voice coil motor (VCM) 43. Thus if the servo head 50 is located accurately, so also is the data head 48. The coil 42 of the VCM 43, together with the carriage arm 46 form the actuator 45. The stator 44 of the VCM 43 is rigidly attached to a base casting 74 which supports the spindle 54, via bearings 80. The base casting 74 is suspended on compliant suspension 78 to a frame 76, which frame 76 is considered immovable.

Although the invention may be used with many kinds of servo information patterns, the preferred embodiment of the invention is described in conjunction with a quadrature dedicated servo pattern as described in the Workman patent and MUELLER, supra. Demodulator 60 processes the servo information into two signals PESN 62 and PESQ 64. PESN 62 is the normal phase and PESQ 64 is the quadrature phase of the demodulated signal. These two signals are fed to analog multiplexor 66. The microprocessor 32 controls the multiplexor 66 via select line 68 to select one of the two signals PESN 62 or PESQ 64 for input to analog to digital convertor (ADC) 70. The microprocessor 32 initiates conversion from analog to digital by means of convert line 72. At a given instant, known as the sampling instant, the ADC 70 and the multiplexor 66 are instructed to convert first one of the PESN 62 or PESQ 64 signals and then, immediately thereafter, to convert the other. At any given sampling instant, n, the sampled and digitized signals may be denoted by PESN(n) 62 and PESQ(n) 64.

The microprocessor 32, the PROM 34 and the RAM 36 together comprise a microcontroller 33. The microcontroller 33 uses a control algorithm, together with the time-sampled signals PESN(n) 62 and PESQ(n) 64 at sample instant n, to calculate a control signal $u_m(n)$ 142. In addition to the time taken to calculate the control signal $u_m(n)$ 142, a small fraction, preferably less than 10%, of the servo sample interval, defined as the length of time between consecutive sample instants, is set aside for the calculations associated with compensating for suspension resonances. Alternatively, periodically, every 30th or 40th sample interval, for example, may be entirely devoted to the task of making the calculations associated with compensating for suspension resonances. Control signal $u_m(n)$ 142 is output to the digital to analog convertor (DAC) 38 at the next write cycle, which DAC 38 produces a corresponding analog signal 39 at its output. This analog signal 39 is used to control the output current of a power amplifier 40 having a defined ratio of output current to input voltage. As a result, a new value of current flows through the VCM 43, causing the carriage 46 to be moved accordingly. The entire process will be repeated at sample instant n+1.

The parameters of the control algorithm used to generate the control signal $u_m(n)$ 142 depend on an accurate knowledge of the gain $K_{dac}$ counts/volt of the DAC 38; the transconductance $g_m$ amps per volt of the power amplifier 40; the force constant $K_f$ newtons/amp of the VCM 43; the mass M kg of the actuator 45; the gain $K_x$ volts per meter of the demodulator 60; and the gain $K_{adc}$ counts per volt of the ADC 70. The multiplexor 66 is assumed to have a gain of unity. The actuator acceleration factor, aaf, is defined as:

$$aaf = \frac{K_{dac}\, g_m\, K_f\, K_x\, K_{adc}}{M} \tag{1}$$

To create a model of the plant, the procedure of "discretization" described in FRANKLIN, supra, at 46 is adopted. It is assumed, for simplicity and without limiting the scope of the invention, that the DAC 38 is updated virtually synchronously with PES sampling. Therefore, a "Prediction Estimator", Id. at 251 is used. Cable bias will be canceled by the use of the technique described Id. at 292. Although the preferred embodiment assumes a linear motion VCM 43, the invention is equally applicable to systems utilizing rotary motion VCM's.

FIG. 3 is a simplified block diagram of the control system employed to control movement of the data head 48 and the servo head 50. The DAC 38 includes software limits $\pm u_{max}$ on the word written to it. The output of the DAC 38 is delivered to power amplifier or current source included in block 84, having gain $g_m$. The output of the power amplifier included in 84 creates VCM force 86 which is proportional to the force constant $K_f$, 40, of the VCM. The VCM force 86 and the disturbing force $F_d$ 88, which results from the cable bias and other sources, are combined into accelerating force 90 acting on the movable carriage 46. The accelerating force 90 is converted to velocity v 93 according to the transfer function 92, which velocity v 93 is then converted to the position y 128 of the heads according to the transfer function 94. In summing junction 96, the actual track displacement $y_{ref}$ 120 is subtracted from the head position y 128 resulting in position signal 130. The track displacement $y_{ref}$ 120 is obtained from the Laplace transform of transfer function S(s) 126, which represents a model of the effect of the actual suspension 78. The suspension 78 experiences the VCM force 86 in an equal and opposite sense to that experienced by the carriage 46 and as a result causes a track displacement equal to $y_{ref}$ 120.

The demodulator 60 with transducing constant $K_x$ converts position signal 130 into a voltage signal which is applied to the sample and hold ADC 70 with conversion gain $K_{adc}$ counts per volt. The state estimator 102 models the plant, taking as inputs the sampled position $y_m$ 132 and the control signal $u_m$ 142, and producing estimated values for the bias $\hat{u}_d$ 138, velocity $\hat{v}$ 136, and position $\hat{y}$ 134. The estimated position y 134 is then subtracted from the commanded position $y_r$ 103 to form position error $y_e$ 104. A nonlinear function block f(.) 106 generates a velocity command $v_c$ 107 as a function of the position error $y_e$ 104. The estimated velocity $\hat{v}$ 136 is subtracted from the velocity command $v_c$ 107, establishing a control signal u 118 with gain factor $k_2$ 110, which gain factor 110 may be adjusted to establish the closed loop bandwidth. Finally, the estimated cable bias $u_d$ 138 is subtracted from the control signal u 118, resulting in a neutralization of the cable bias.

A compensator 114 tracks suspension induced track motions and has a transfer function $G(z^{-1})$ from the input control signal u 118 to the output supplementary parallel forward loop compensator signal $y_4$ 124. If the compensator 114 is accurate, then $G(z^{-1})$ will have a resonant frequency and damping equal to that of the suspension 78. The output $y_4$ 124 of the compensator 114 is scaled within the compensator 114 and algebraically subtracted from the control signal u 118 by the summing junction 112. Additional inputs to the compensator 114 include learned parameters 122 which determine the parameters of $G(z^{-1})$. PES samples $y_m$ 132 are input to the Learning Algorithm 116, which generates the learned parameters 122. An additional mode input or inputs 117 are used to prescribe the nature of the learning procedure. For example, after the disk 52 is first at speed, the learned parameters 122 are preset at nominal expected values whereas during normal operation the learned parameters 122 are continually updated from the previously learned values. The timing input 119 to the learning algorithm 116 is used to instruct the learning algorithm 116 to take fresh data only from post seek PES samples resulting from seek lengths having a range of predetermined time durations which cause significant post seek tracking errors.

One method of selecting f(.) 106 is specified in FRANKLIN, supra, at 584, and in more detail in M. Workman, "Adaptive Proximate Time-Optimal Servomechanisms" 46, Ph.D. thesis, Stanford University (1987). Also suggested in these two references are methods for choosing $k_2$. In the preferred embodiment, variations in aaf are assumed to be compensated by one or both of the methods disclosed in the Edel patent and in H. Otteson, "Digital Servo Control for High Performance VCM in DASD" 23–28, Proceedings of Eighteenth Annual Symposium, Incremental Motion Control Systems Society (1989).

Figure 4:
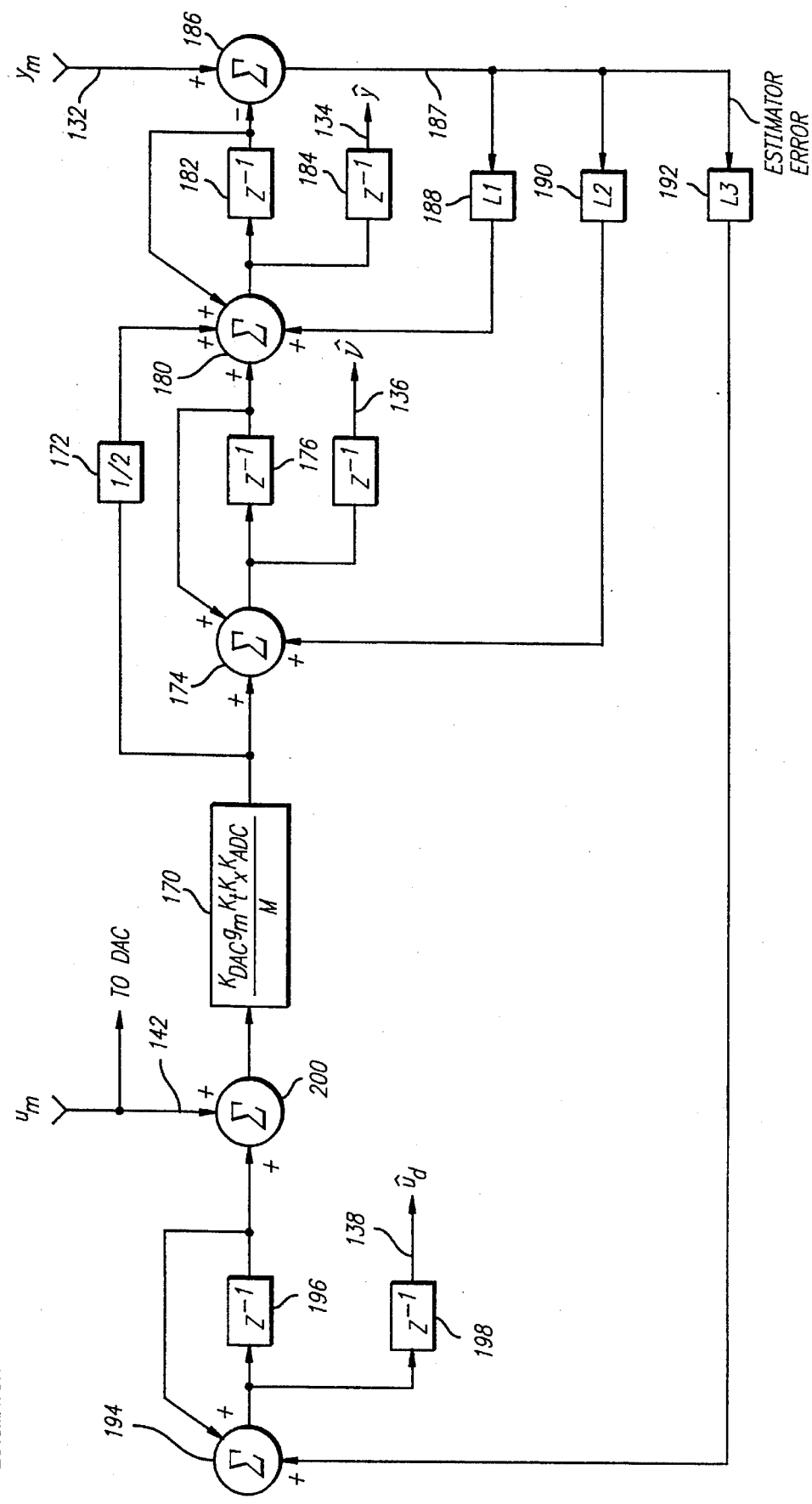
FIG. 4 is a block diagram of the preferred state estimator.

FIG. 4 is a block diagram of the predictor state estimator 102 shown in FIG. 3 and known also as the "model" of the plant. The actuator acceleration factor (aaf) is represented by block 170. The control signal $u_m$ 142 and the sampled position $y_m$ 132 are input to the state estimator 102 at summing junctions 200 and 186 respectively. Delay blocks 176, 182, and 196 have a delay equal to the sampling interval of the servo. Delay blocks 178, 184, and 198 represent the computational delay in the microcontroller 33 which in this case is assumed to be equal to the sample interval. Coefficient blocks 188, 190, and 192 represent the L vector $[L_1, L_2, L_3]$, which establishes the bandwidth of the estimator. The input 187 to the coefficient blocks 188, 190, and 192 represents the estimator error. The L vector values may be established by a number of methods, for example using the Random Neighborhood Search algorithm described in FRANKLIN, supra, at 625, or alternatively by pole placement methods as described Id. at 241, 271. The outputs of the state estimator are the estimated bias $u_d$ 138, the estimated velocity v 136, and the estimated position y 134 as shown in FIG. 3. It should be noted that the invention is not limited to use with systems employing a state estimator. The compensator 114 functions independently of the estimated values of bias, velocity and position and relies instead upon the PES samples and the control signal written to the DAC.

Figure 5:
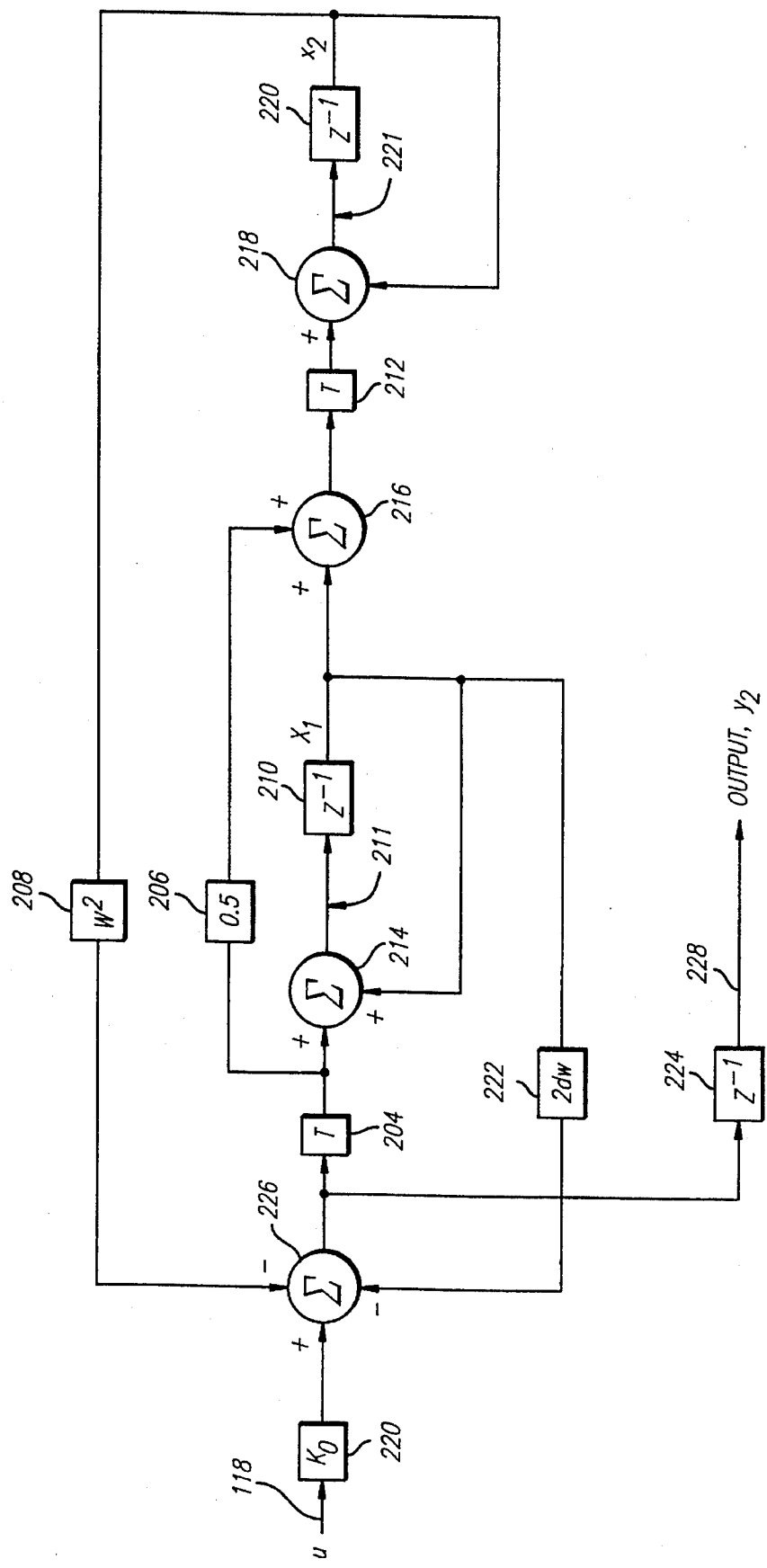
FIG. 5 is a block diagram specifying the preferred second order algorithm embodied in the digital compensator.

FIG. 5 is a block diagram of the second order algorithm used as a component of the compensator $G(z^{-1})$ 114 shown in FIG. 3. The interaction, via the suspension 78, between the actuator 45 and the frame 76 can be viewed as a mass-spring system with a damping factor. The force or torque exerted on the stator 44 and the base casting 76 is proportional to the second derivative of the position of the actuator 45. As a result, the dynamic response of most suspension systems is predominantly second order and therefore a second order algorithm is employed in the preferred embodiment, although algorithms of higher order could of course be employed as discussed later in this description.

The control signal u 118 is input to the compensator 114 whereby the suspension system 78 shown in FIG. 2 is approximated by a second order transfer function given by:

$$S(s) = \frac{1}{M} \frac{s^2}{s^2 + 2dws + w^2} \qquad (2)$$

where M is the mass of the base casting 74, d is the damping factor, and w is the natural frequency of the suspension 78. The physical characteristics M, d and w are selected as parameters of the transfer function because of the physical relationship between the post-seek displacements and the resonance of the suspension. However, as will be later discussed, the function of the compensator is not to accurately model the dynamic characteristics of the suspension, but rather to directly adapt itself to minimize the actual post-seek displacements.

In the circuit of FIG. 5, the values of the signals at points $x_1$ 211, $x_2$ 221 and $y_2$ 228 are given by the equations:

$$x_1(k+1) = (1 - 2dwT)x_1(k) + (-w^2)x_2(k) + (k_0T)u(k) \qquad (3)$$

$$x_2(k+1) = (T)x_1(k) + \left(1 - \frac{w^2T^2}{2}\right)x_2 + \left(\frac{k_0T^2}{2}\right)u(k) \qquad (4)$$

$$y_2(k) = (-2dw)x_1(k) + (-w^2)x_2(k) + (k)u(k) \qquad (5)$$

where k represents the sample number in the sequence, and $k_0$ is a constant.

The motion of the suspension 78 can be expressed in state variable representation as a set of first-order ordinary differential equations. We define x as the system state, u as the control input to the system, and y as the output of the system. Then, the transfer function S(s) may be expressed in state space form as follows:

$$\dot{x} = Ax + Bu \quad y = Cx + Du \qquad (6)$$

where the coefficients of the state variable equations are given by the matrices:

$$A = \begin{bmatrix} -2dw & -w^2 \\ 1 & 0 \end{bmatrix} \quad B = \begin{bmatrix} \frac{1}{M} \\ 0 \end{bmatrix}$$

$$C = [-2dw \quad -w^2] \quad D = \left[\frac{1}{M}\right]$$

In the preferred embodiment, the second order algorithm corresponding to the above transfer function S(s) is a discrete time version of S(s) with an additional scaling factor. The additional scaling factor is necessary to minimize the post seek tracking error. The synthesis of the discrete time version of S(s) may proceed in an accurate way or through the use of an approximation. The discrete approximation approach results in important advantages in the operation of the compensator 114. First, the computational burden involved in generating the output $y_4$ 124 is significantly reduced. Secondly, the adaptation process automatically corrects for any errors introduced by the approximation, making a more accurate computation unnecessary. Third, the adaptation process with the approximation counteracts deficiencies in the ability of the transfer function S(s) to accurately predict the dynamic response of the suspension. Finally, the approximation can correct for displacements introduced by variations in characteristics of system components other than those of the suspension system. Since the approximation is performed to directly minimize displacements, it is not limited to disturbances introduced by the suspension and will incorporate other sources of post-seek errors as well.

The approximate discrete time equivalent of the second order transfer function, with a factor $k_0$ which includes the 1/M term and the scaling factor that minimizes tracking errors, is expressed in state form as:

$$\dot{x} = Fx + Gu \quad y = Hx + Ju \tag{7}$$

where the coefficients of the state variable equations are given by the matrices:

$$F = \begin{bmatrix} 1 - 2dwT & -Tw^2 \\ T & 1 - \frac{Tw^2}{2} \end{bmatrix} \quad G = \begin{bmatrix} k_0 T \\ \frac{k_0 T^2}{2} \end{bmatrix}$$

$$H = [-2dw \quad -w^2] \quad J = [k_0]$$

where T is the sampling interval of the servo. Due to computation delay 224 shown in FIG. 5 and other effects, the output $y_2$ 228 of the second order algorithm is a little late. Consequently, a phase advance algorithm is cascaded with the second order algorithm in order to compensate for the time delay.

Figure 6:
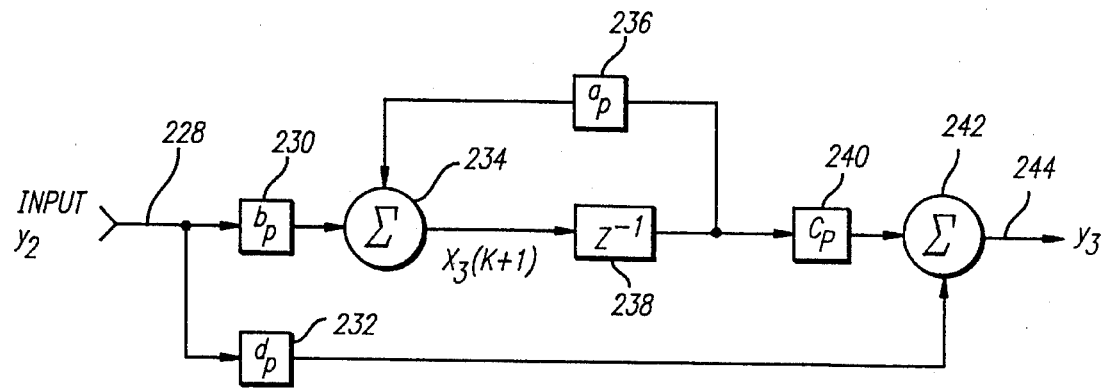
FIG. 6 is a block diagram specifying the preferred phase advance algorithm embodied in the digital compensator.

FIG. 6 is a block diagram of the phase advance algorithm utilized in the preferred embodiment. The output $y_2$ 228 of the second order algorithm in FIG. 5 is delivered as an input to the phase advance algorithm.

The phase advance algorithm proposed is a simple first order algorithm. Its state matrices are all scalar; $a_p$ 236, $b_p$ 230, $c_p$ 240 and $d_p$ 232 respectively. The purpose of the phase advance algorithm is to provide a relatively fixed gain and phase advance over a broad range of frequencies centered at the nominal resonant frequency $w_n$ of suspension 78. In the circuit of FIG. 6, the values of the signals at points $x_3$ 237 and $y_3$ 244 are given by the following equations:

$$x_3(k+1) = ax_3(k) + by_2(k) \tag{8}$$

$$y_3(k) = cx_3(k) + dy_2(k) \tag{9}$$

where k is the sample number in the sequence.

The values of $a_p$ 236, $b_p$ 230, $c_p$ 240 and $d_p$ 232 are synthesized using a bilinear, prewarped, transformation of the continuous system transfer function given by:

$$P(s) = \frac{1 + sT}{1 + hsT} h^{0.5} \tag{10}$$

with h set at 0.4 and $Th^{0.5}$ set equal to $w_n$. This prototype continuous domain transfer function is selected because it has a gain of 1 at $w_n$ while providing a phase advance which is within 0.5° of 25° over the frequency range $w_n/1.5$ to $1.5w_n$ while at the same time having a gain within ±1.5 db of unity over the same frequency range. This range comfortably exceeds the range over which suspension resonance frequency might vary due to sample variations, temperature, and aging. The bilinear prewarped transformation may be carried out using the "MATLAB" software package together with the Control Systems Toolbox, published by The Mathworks, Inc. Natick, Mass. 01760. The output of the phase advance algorithm, $y_3$ 244, is combined with the output of the second order algorithm $y_2$ 228 as shown in FIG. 7.

Figure 7:
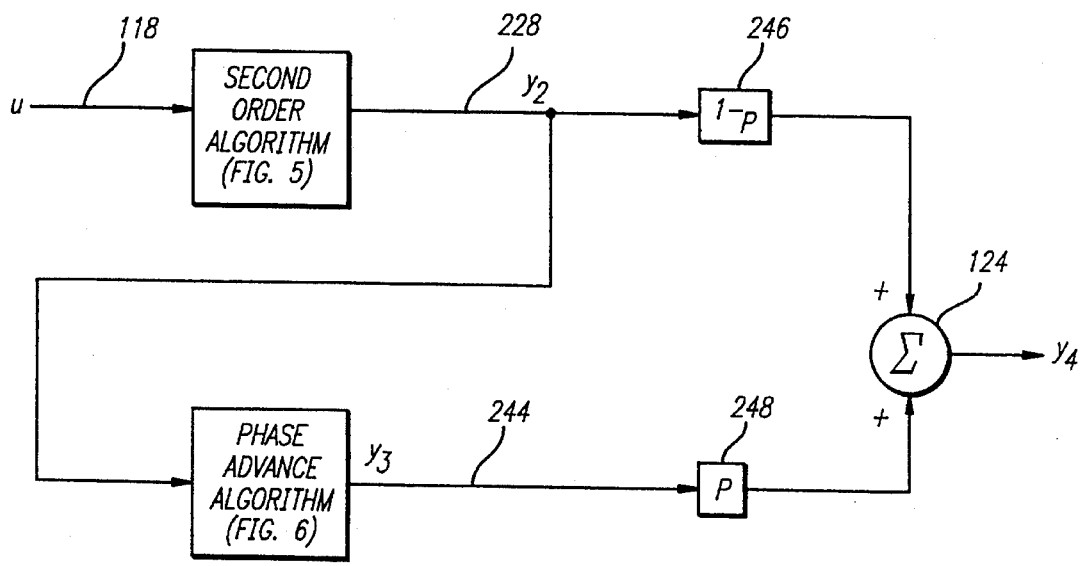
FIG. 7 is a functional block diagram of the digital compensator, showing the combination of the second order algorithm with the phase advance algorithm.

FIG. 7 is a block diagram showing the combination of the second order algorithm of FIG. 5 with the phase advance algorithm of FIG. 6. The two algorithms are cascaded to provide a phase advanced version $y_4$ 124 of the second order algorithm output, having relatively fixed phase advance over the range of expected variations in suspension resonance frequency. To provide for a phase advance which can be varied by the adaptation algorithm, a fraction p 248 of the phase advanced signal $y_3$ 244 is added to a fraction (1−p) 246 of the non-phase advanced signal $y_2$ 228. The output $y_4$ 124 of the circuit in FIG. 7 is thus given by the equation:

$$y_4 = (1-p)y_2 + py_3 \tag{11}$$

This output $y_4$ 124 represents the supplementary parallel forward loop compensator signal to the DAC 38 as shown in FIG. 3.

Figure 8A:
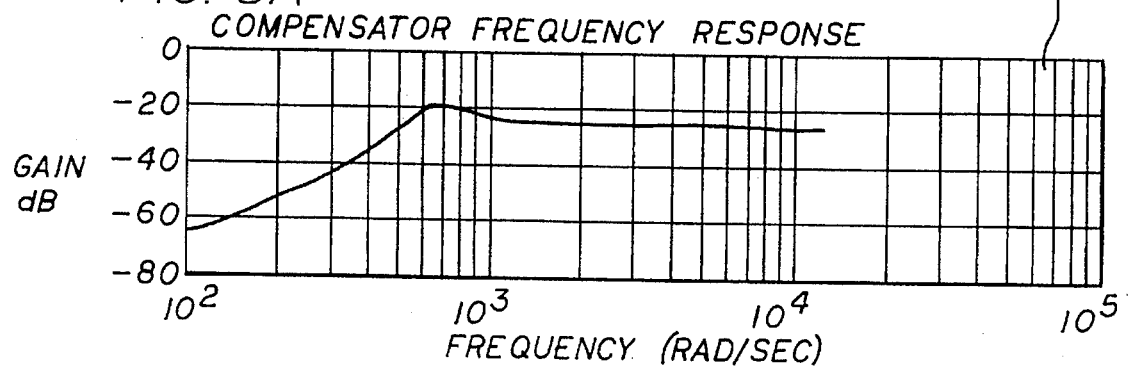
FIG. 8A and FIG. 8B together are a two-part graphical representation of the frequency response of the digital compensator, showing in FIG. 8A the gain in db and in FIG. 8B the phase in degrees.
Figure 8B:
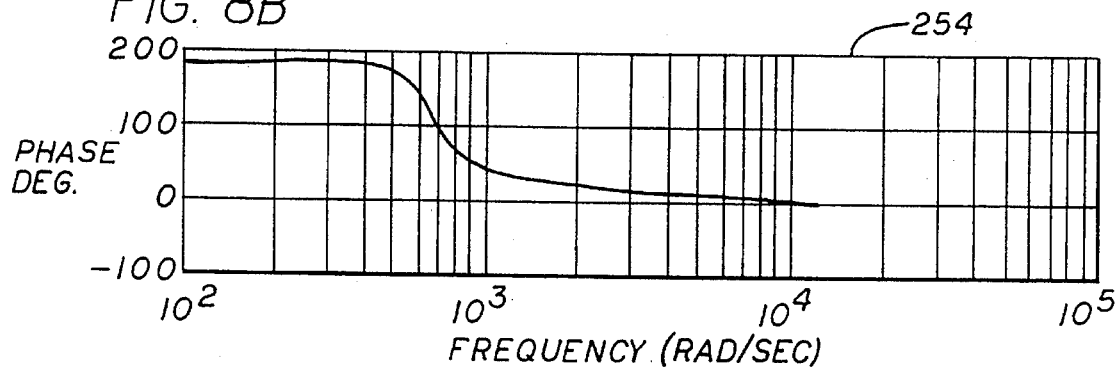

FIG. 8 graphically illustrates the frequency response (gain 252 and phase 254) of the compensator 114 with the fraction p 248 equal to 1 and the scaling factor $k_0$ 202 set at a value appropriate to minimizing the tracking error.

Figure 9A:
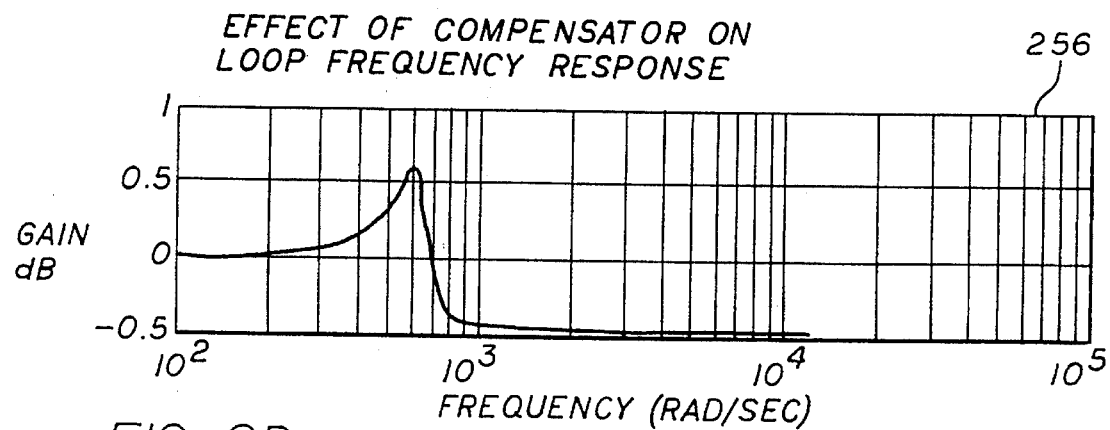
FIG. 9A and FIG. 9B together are a two-part graphical representation of the effect of the digital compensator on the frequency response of the control loop of FIG. 2, showing in FIG. 9A the gain in db and in FIG. 9B the phase in degrees.
Figure 9B:
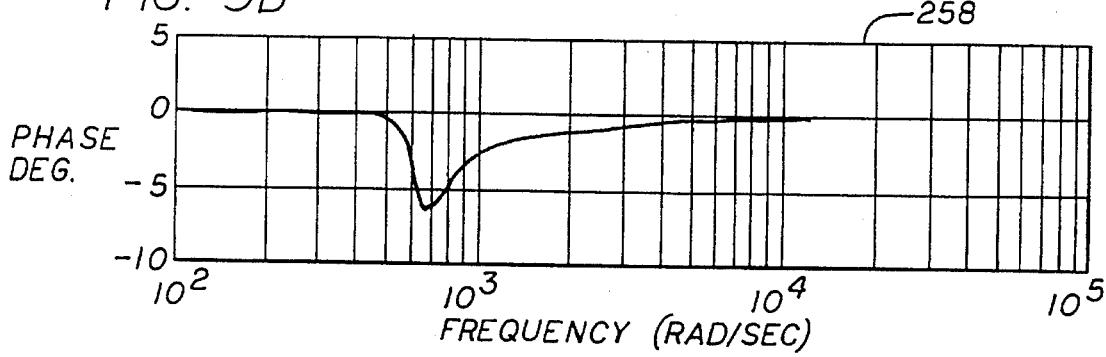

FIG. 9 graphically illustrates the effect of the compensator 114 on the loop frequency response (gain 256 and phase 258). In this particular example, the introduction of the compensator produces gain changes of no more than 0.6 db, and phase changes of no more than 6°.

Figure 10:
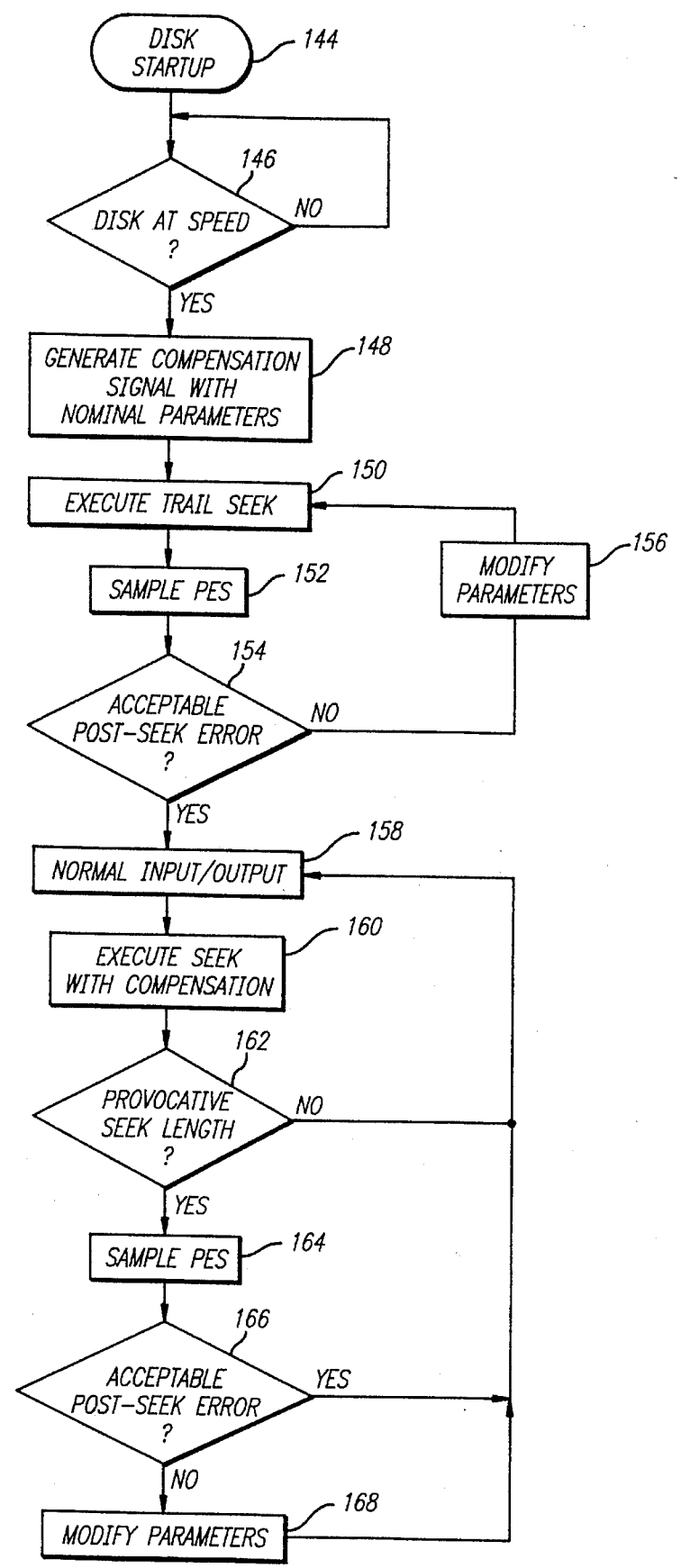
FIG. 10 is a flow chart of the adaptive positioning control sequence.

FIG. 10 is a flowchart illustrating an exemplary sequence for controlling the adaptive positioning system. Such a control sequence is performed by the microcontroller 33. After the disk starts up 144 and reaches the proper speed 146, the initial adaptation procedure is commenced 148. In order to perform the adaptation procedure, only four "free" parameters need be adjusted: w, d, $k_0$ and p. The successive sets of parameters are chosen by a minimization algorithm. Cost value minimization algorithms are well known in the art. A suitable example is the Nelder-Meade simplex described in PRESS, FLANNERY, TEUKOLSKY & VETTERLING, NUMERICAL RECIPES, 289 (1986). Using the Nelder-Meade simplex, one iteration comprises five steps, i.e. one more than the number of parameters to be adjusted. Thus one Nelder-Meade iteration requires five trial seeks. Each seek is carried out with a different parameter set in accordance with the Nelder-Meade algorithm. The first parameter set is the set of values which the design process has established as working best with a nominal system. The design process establishes the nominal parameter set based on a combination of simulations and measurements. From this parameter set four other parameter sets are automatically generated by the Nelder-Meade algorithm. A parameter known as the characteristic length scale (see NUMERICAL RECIPES, supra, at 290) is selected to be approximately 0.1. The optimum value of this parameter may vary between different models or families of models and may be optimized by simulation and experimentation with an actual disk drive. The five parameter sets must be converted into the components of state space matrices F, G, H, and J, in accordance with the formulae presented above in equation (7). This conversion involves very few computations, all of which are adds and multiplies.

During the initial adaptation, five trial seeks are undertaken 150, each with a different one of the parameter sets. Beginning shortly after the end of each seek, a predetermined number of PES samples is acquired 152. The first PES sample is preferably taken approximately 1 millisecond after the control signal u 118 has dropped below approximately 10% of its peak value during the seek. The number of PES samples preferably encompasses at least one period of the nominal suspension resonance frequency. To reduce the effect of noise and external vibrations the PES samples are then filtered using a low pass Infinite Impulse Response (IIR) digital filter. The IIR filter is designed to roll off steeply at frequencies slightly higher than the largest expected suspension resonance frequency. Such filter is preferably a fifth order low pass elliptic filter with a cut off frequency approximately 50% higher than the largest expected resonance frequency. The elliptic filter should be specified for 1 db of ripple in the pass band, and at least 30 db attenuation in the stop band. The coefficients of such a digital filter can be calculated using the MATLAB Software Package, supra, together with the Signal Processing Toolbox, also available from the Mathworks, Inc. The filter calculations are carried out in the small fraction of the servo sample time interval set aside for the adaptation process. Since only the peak value of the samples is of interest, the phase shift introduced by the filter is relatively unimportant. The cost of each of the five parameter sets is calculated and depending on the results, a new group of five parameter sets is established 156 for five further seeks.

The performance of the filter can be enhanced by advancing the sampling of the PES signals. Because there is some computational delay involved in making the filter calculations, the output of the filter will not be immediately available to the cost minimization algorithm. Thus it is desirable to accumulate a small number of PES samples, preferably three or four, to initialize the filter and prepare it for the PES samples required for the adaptation process.

The cost is a nonlinear function of the maximum filtered PES signal. If the maximum filtered PES signal $p_m$, is expressed as a percentage of the track pitch, the cost is preferably given by:

$$\text{cost} = \left( \frac{p_m}{p_t} \right)^n \tag{12}$$

where $p_t$ is the tolerable percentage error, say 5%, and where n is an integer in the range 5 to 10.

The trial seeks 150 continue as shown in 154 until the cost is satisfactorily small, e.g. corresponding to peak tracking errors of less than 5%. When this happens, the initial adaptation is judged complete and the disk drive is ready for normal activity 158.

During normal transactions 160 between host computer and the disk drive, both the damping and resonant frequency of the suspension might change due to temperature variations or aging. The compensator 114 must track this process. The adaptation process is now in the update mode. The learning algorithm 116 will calculate four sets of parameters 122 derived from the optimized parameter set learned at start up. The first normal seek which is followed by a track following mode long enough to acquire the predetermined number of post seek PES samples 162, designated as a "provocative" seek length, and for which the maximum filtered PES sample 164 exceeds 5% of a track pitch will be called the first "cost" seek 166. For this seek the learning algorithm 116 filters the PES samples 164, finds the maximum and calculates the cost as a background task. While this calculation proceeds, further acquisition of PES samples, if they occur, is inhibited.

In the update mode, the Nelder-Meade algorithm uses a smaller value of the characteristic length than is used in the start up adaptation. This is done because the learning process has only to adapt to modest changes in suspension characteristics, and also to ensure that seeks which are executed with any of the five parameter sets will all be well behaved, although slightly different from one another. This second parameter set is therefore reasonably close to the optimum and will not result in poor settling characteristics.

Seeks following the first cost seek are now executed with the modified parameter set 168. A normal seek will eventually be encountered which results in acquisition of the predetermined number of post seek PES samples 162 (a provocative seek) and for which the maximum filtered PES sample exceeds 5% of a track pitch 164. This will be called the second cost seek 166 since it allows the determination of a cost value associated with the second set of parameters. This process is repeated until five cost seeks have been examined, and five corresponding cost values have been calculated. With the five cost values, the Nelder-Meade algorithm in the update mode now computes a new group of five parameter sets and the cycle repeats. The learning process is indifferent to the length of the cost seeks since the compensator, when well adjusted, operates successfully with all seek lengths.

Figure 11:
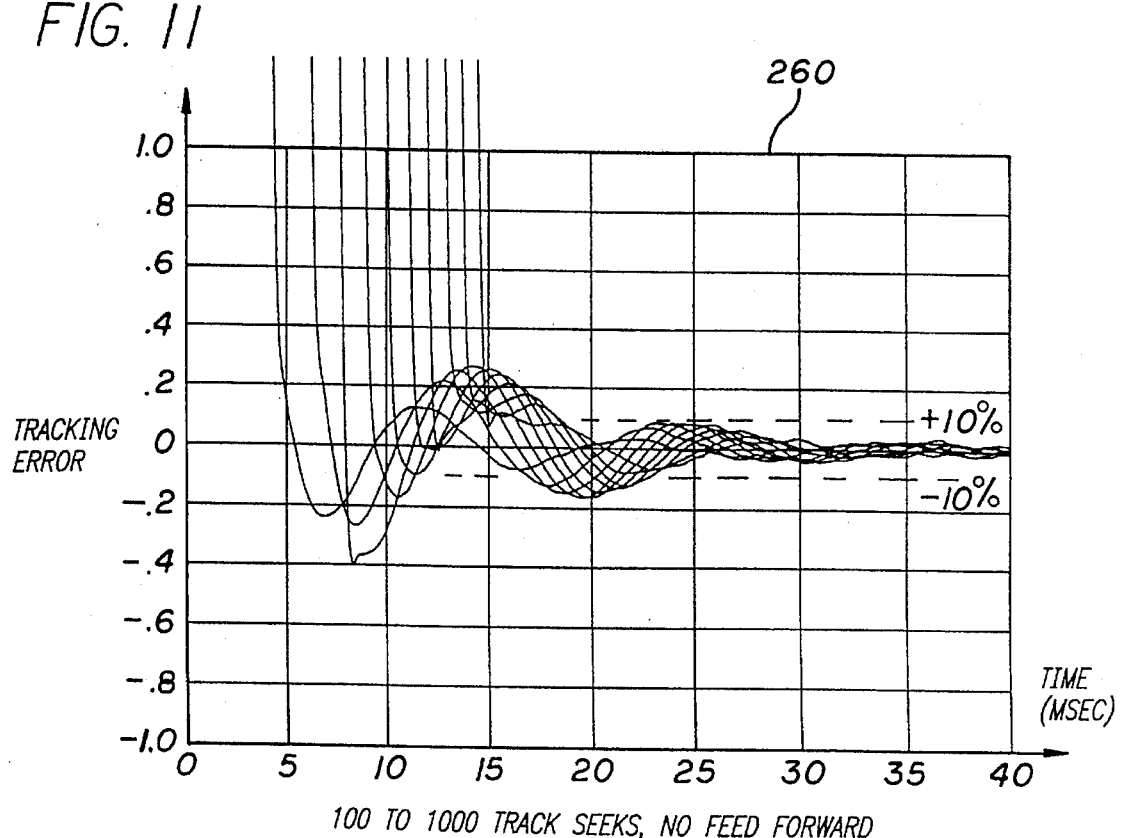
FIG. 11 is a graphical representation of the settling characteristics for seek lengths from 100 to 1000 tracks without the adaptive positioning system.

FIG. 11 graphically represents the settling characteristics of the data head 48 and the servo head 50 for seek lengths from 100 to 1000 tracks before the introduction of the compensator 114 as described above. As this figure shows, for certain seek lengths, the tracking error remains outside the 10% tracking limits, denoted by the upper and lower dashed lines, for a considerable period of time.

Figure 12:
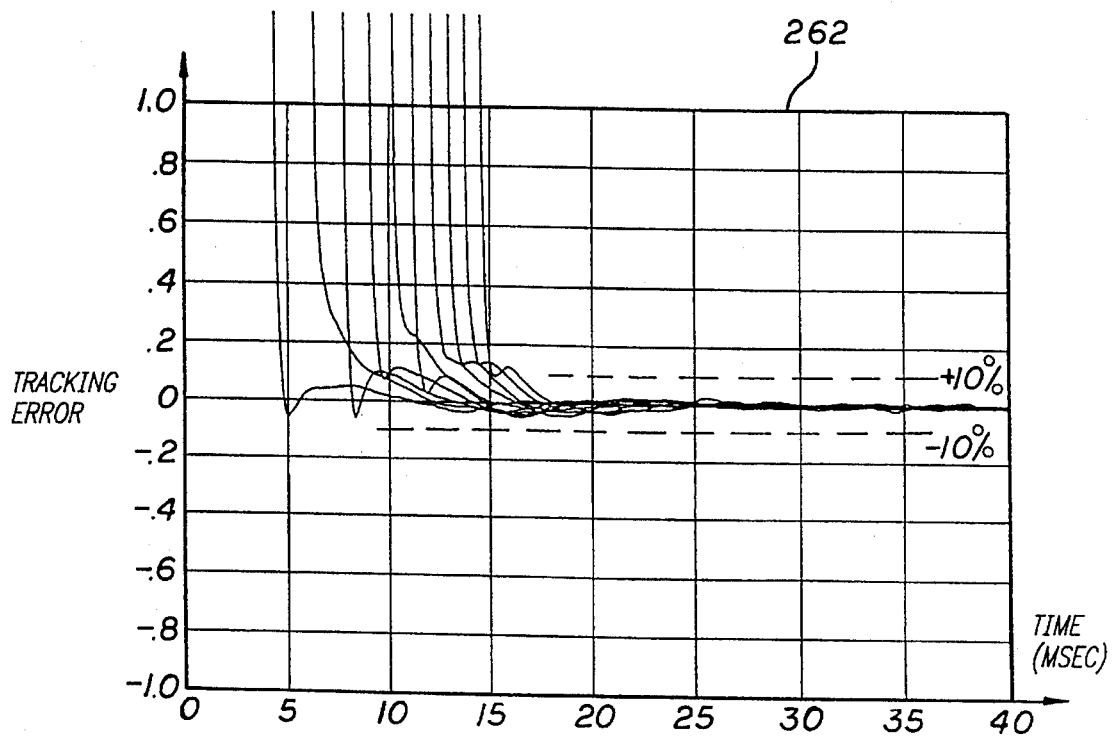
FIG. 12 is a graphical representation of the settling characteristics for seek lengths from 100 to 1000 tracks with the adaptive positioning system.

FIG. 12 graphically represents the settling characteristics of the data head 48 and the servo head 50 for seek lengths from 100 to 1000 tracks utilizing the compensator 114 as described above. Although there are only very small changes to the loop frequency response, the settling characteristics are substantially improved over those depicted in FIG. 11. The results in FIG. 12 reflect the situation obtaining after the initial adaptation procedure has been completed.

In conclusion, it is to be understood that the foregoing detailed description and the accompanying drawings illustrate one preferred embodiment of the invention. Variations from this preferred design may, of course, be made. Thus, by way of example and not of limitation, the following alternative embodiments are envisioned. To reduce the time taken to learn the parameter set appropriate for a given sample of disk drive, this parameter set would be learned during manufacturing and stored on a spare track on the disk. Upon start up, these starting parameters, usually much closer to the optimum parameter set for the particular disk drive, are read from the disk, thus shortening the start up adaptation time considerably.

It is possible to turn off the input to the compensator while in track following mode. The output is still available to compensate for post seek track displacements, but the phase and gain margin of the servo are unaffected by the compensator.

If the time taken to perform the start up adaptation is not acceptable for the particular system involved, the disk drive may signal the host that it is ready as soon as the disk is at speed. In this case, the adaptation algorithm is set to the updating mode. Early data transactions between the host computer and the disk drive may involve slightly extended seek durations for seek lengths of the provocative type until the adaptation process catches up with the discrepancy between the compensator and the suspension characteristics.

The updating mode of the adaptation may be more effective if, at relatively lengthy intervals, the disk drive performs trial seeks during idle times. The intervals between trial seeks can be made long because the suspension changes its characteristics slowly. For example, the five trial seeks constituting a group for the Nelder-Meade algorithm may be executed at approximately one minute intervals. The trial seeks are abandoned if the host computer makes a transaction request. Otherwise, the trial seeks are continued and can be used for the Nelder-Meade cost minimization procedure. This approach works quite well at the expense of a modest impact in average transaction throughput.

The adaptive positioning system described herein is generally applicable to disk drive positioning systems and a principle advantage of the invention is that it is independent of the particular design or physical structure of a head positioning control system. The adaptive positioning system may be used in systems not employing a state estimator or a prediction estimator, and in systems designed to utilize a current estimator.

The principles of the invention are not limited to a second order response and may be applied to compensators employing transfer functions of third or higher order. For example, if it is desired to compensate for displacements induced by a larger number of variations in the disk drive, a higher order response is assumed and the number of free parameters to be optimized is correspondingly increased. The Nelder-Meade simplex is the preferred algorithm, although other minimization algorithms may be used. The Nelder-Meade is appropriate for up to approximately six free parameters. Beyond this number, other well-known algorithms are available and may be used to optimize the compensator output.

The preferred embodiment as described herein can be generally regarded as a "distance-based" positioning system in which the position signal is a non-linear function of the estimated head displacement and velocity. The adaptive positioning system may also be used in a "time-based" positioning system in which the non-linear function f(.) is replaced by a linear combination of the time-varying derivatives of head position. In such a time-based system, the compensator output would constitute a feedforward component of the position signal delivered to the head positioning system. Accordingly, it is to be understood that the invention is not limited to the precise arrangements shown in the drawings and as described hereinabove.

What is claimed is:

1. A disk drive storage system utilizing adaptive head positioning comprising:

one or more storage disks;

at least one of said storage disks including servo control information encoded thereon;

means including a plurality of heads for performing input and output operations on said storage disks;

means for mounting one of said heads to read said servo control information;

means for mounting and positioning said heads with respect to said disks;

control circuitry coupled to said means for mounting and positioning said heads for regulating a movement of said heads with respect to said storage disks;

a compliant suspension system supporting said storage disks and said means for mounting and positioning said heads, said compliant suspension system allowing a deflection of the disk drive storage system during the movement;

means for measuring a radial displacement of said heads relative to a desired position, known as a position tracking error, the radial displacement and the desired position being relative to said disks, the radial displacement after a control input to said control circuitry has substantially subsided being measured to provide a correction factor;

means for predicting position tracking errors resulting from an acceleration of said heads across said disks and a resultant deflection of the disk drive storage system as a result of said compliant suspension system, the acceleration being caused by an application of the control input to said control circuitry, said means for predicting including a continuous transfer function receiving as inputs the control input and the correction factor; and means for dynamically adapting a positioning of said heads to oppose the position tracking error and to maintain said heads substantially on a track despite the position tracking error which otherwise would have occurred;

said means for predicting position tracking errors comprising:

means for detecting the position tracking error using servo pulse signals;

means for determining when a magnitude of the position tracking error exceeds a predetermined threshold;

means for modelling the position tracking error as a dynamic response of a damped system of at least a second order, according to a transfer function with variable parameters;

means for applying supplemental signals generated using said means for modelling to said control circuitry; and means for modifying said variable parameters to minimize a time required for said heads to settle on the track with subsequent position tracking errors remaining below the pre-determined threshold.

2. A disk drive storage system utilizing adaptive head positioning as defined in claim 1 including a support base upon which is mounted said disks and said means for mounting and positioning heads, said support base being attached to a frame by means of said suspension, said transfer function being expressed in state space form in terms of the support base mass M, the damping factor d, and the natural frequency w of the suspension as:

$$\dot{x} = Ax + Bu \quad y = Cx + Du$$

$$A = \begin{bmatrix} -2dw & -w^2 \\ 1 & 0 \end{bmatrix} \quad B = \begin{bmatrix} \frac{1}{M} \\ 0 \end{bmatrix}$$

$$C = [-2dw \quad -w^2] \quad D = \begin{bmatrix} \frac{1}{M} \end{bmatrix}$$

3. A disk drive storage system utilizing adaptive head positioning as defined in claim 1 including means for approximating said transfer function by a discrete time version with an additional scaling factor.

4. A disk drive storage system utilizing adaptive head positioning as defined in claim 1 wherein a single transfer function is used for all seek lengths.

5. A disk drive head positioning system utilizing a supplementary parallel forward loop compensator signal to anticipate and cancel a head displacement induced by dynamic responses of a suspension system to accelerations of a head across a rotating disk or disks, the system comprising:

means for mounting and positioning the head with respect to the disks;

control circuitry coupled to said means for mounting and positioning the head for regulating a movement of the head with respect to said disks;

a compliant suspension system supporting the disks and said means for mounting and positioning the head;

means for detecting a position of the head with respect to the disks;

means for estimating an effective natural frequency and a damping factor of said compliant suspension system; and means for generating a control input to be delivered to said control circuitry, the control input including a supplementary parallel forward loop compensation component which compensates for the head displacement induced by the dynamic responses of said compliant suspension system in order to maintain the head substantially on a track despite the dynamic responses;

wherein the supplementary parallel forward loop compensator component is substantially a function of the estimated effective natural frequency and the damping factor of said compliant suspension system;

said means for detecting a position of the head with respect to the disks comprising:

servo control information encoded on at least one of the disks;

means for mounting the head to read said servo control information;

circuitry to sample the displacement of the head relative to a position desired; and means for detecting when a magnitude of the displacement exceeds a pre-determined threshold.

* * * * *